United States Patent [19]

Perrault et al.

[11] 3,923,277
[45] Dec. 2, 1975

[54] SUPPORTING DEVICE

[76] Inventors: Frederick Perrault, 2644 W. 225th St., Torrance, Calif. 90505;
Raymond E. Perrault, 23441 Batey Ave., Harbor City, Calif. 90710

[22] Filed: Feb. 25, 1974

[21] Appl. No.: 445,537

[52] U.S. Cl. .................. 248/49; 211/176; 211/177; 248/68 R; 248/70
[51] Int. Cl.² ............................................ F16L 3/00
[58] Field of Search ............ 248/68 R, 49, 74 B, 73, 248/59, 72, 243, 247, 207, 221, 67.7, 74 PB, 300; 211/177, 176; 403/292, 293

[56] References Cited
UNITED STATES PATENTS

| | | | |
|---|---|---|---|
| 617,524 | 1/1899 | Drake | 248/300 X |
| 882,835 | 3/1908 | McGillivray | 248/300 X |
| 939,368 | 11/1909 | Withem | 248/300 X |
| 1,007,138 | 10/1911 | Peirce | 248/68 R |
| 1,097,273 | 5/1914 | Tyler | 248/68 R X |
| 1,229,427 | 6/1917 | Erismann | 248/243 |
| 1,657,939 | 1/1928 | Rockwell | 248/73 |
| 1,775,391 | 9/1930 | Fassinger | 248/73 |
| 1,802,964 | 4/1931 | Brady | 248/73 |
| 1,853,018 | 4/1932 | Knape | 248/243 |
| 1,861,100 | 5/1932 | Stanitz | 248/247 X |
| 2,384,158 | 9/1945 | Carpenter et al. | 248/68 R |
| 2,387,951 | 10/1945 | Slater et al. | 248/68 R |
| 3,032,606 | 5/1962 | Phillips | 248/67.7 X |
| 3,052,442 | 9/1962 | Rankin | 248/300 X |
| 3,339,870 | 9/1967 | Damsgaard | 248/68 R |
| 3,355,132 | 11/1967 | Jenkins | 248/59 |
| 3,468,430 | 9/1969 | Lawman | 211/177 X |
| 3,486,725 | 12/1969 | Hidassy | 248/74 PB X |
| 3,556,447 | 1/1971 | Jenkins | 248/68 R X |
| 3,633,857 | 1/1972 | Logan | 248/68 R |
| 3,771,665 | 11/1973 | Potter | 211/176 X |
| 3,794,183 | 2/1974 | Colbridge | 248/243 X |
| 3,833,201 | 9/1974 | Dill | 248/300 X |

OTHER PUBLICATIONS
"Telespar the All-Purpose Telescoping-Perforated Traffic Control Support," pp. 2 and 12, Why Telespar Traffic Supports, 1963.

*Primary Examiner*—Roy D. Frazier
*Assistant Examiner*—Rodney H. Bonck
*Attorney, Agent, or Firm*—Gausewitz, Carr & Rothenberg

[57] ABSTRACT

A wireway device including a bracket having two portions at right angles and an interconnecting portion, the two portions having side flanges and flat central parts between the side flanges, one of the central parts including an opening receiving a fastener holding the bracket to a square tube or a bulkhead, the other portion having spaced slots for receiving straps in holding objects to the bracket, the interconnecting portion having two ribs the outer portions of which form continuations of the side flanges, and a central opening between the central parts of the right angle portions of the bracket. The bracket support may include a square tube received between the flanges of the bracket and apertured to receive fasteners for securing the bracket to the tube.

16 Claims, 6 Drawing Figures

SUPPORTING DEVICE

BACKGROUND OF THE INVENTION

In the construction of ships, cables formed of the wires of the electrical system of the ship conventionally are supported by hangers which include spaced brackets attached to the deck above with a supporting member extending between them. The cables are positioned on the support and suitably held to it to complete the installation. This type of arrangement, variations of which are shown in U.S. Pat. Nos. 2,384,158, 2,387,951, Re 26, 175, and 2,939,664, has several disadvantages. One shortcoming is with the cost, both in attaching the wire hanger to the structure of the ship and the cables to the hanger. The use of two brackets for each support means that considerable labor is necessary in installing the bracket. Also, it is necessary to laboriously feed the cables through the spaces defined by the wire hangers when the cables are to be secured. Wire hangers of the prior art are not adapted to attachments to bulkheads or the like, lacking flexibility in their manner of installation on the ship. Previously devised wire hangers may not permit the cables to be routed around existing obstructions, such as previously installed piping, and are of limited capacity.

SUMMARY OF THE INVENTION

The present invention provides a greatly improved wireway overcoming the above-noted difficulties and others which have been prevalent in the prior art. it is economical to manufacture, rapidly and easily installed, has a much greater capacity than previous designs, is light in weight, and is adaptable to the different areas within the ship to allow the wires to be extended around obstructions, horizontally or vertically, so as to be installed in almost any desired manner.

The wire hanger of this invention includes a bracket which is shaped as a channel and has a first portion at right angles to a second portion with an interconnecting part between these two portions at a 45° angle. One of the portions is apertured for attachment to a supporting structure, while the other has slots through it, adapted to receive straps used in connecting cables to the bracket. The end of the slotted portion is recessed to receive the strap and prevent its being dislodged.

The interconnecting portion of the bracket includes a rib at either side which results in a particularly strong and rigid connection so that the wire support has a very high load capacity. An opening between the ribs allows the ribs to be formed so as to have adequate depth for strength and rigidity. The opening also enables the length of the portion of the device which is attached to the structure to be greater, which also improves the load capacity of the bracket. This design allows the bracket to be made of aluminum alloy for weight saving while still being capable of supporting substantial loads. The bracket may be secured to a square support tube extending between decks, the tube having apertures through it which receive bolts which also extend through the brackets to form the attachment. The flanges of the channel sections of the brackets fit around the square tubing so that the bracket is positioned securely and at the proper angle without danger of becoming twisted relative to the support. A single bolt can be used to attach either one or two of the brackets to the tube. The support tube may be extended by adapters in the form of smaller tubes similarly apertured, which fit within the end of the larger tube. The adapter tubes may be made of steel to allow welding to a bulkhead of deck, with the remainder of the tube of aluminum for weight saving.

Alternatively studs may be welded to a bulkhead and received in the fastener openings in the brackets, thereby attaching the brackets directly to the bulkhead or deck. These brackets may be in horizontal or vertical runs or at an angle as needed.

BRIEF DESCRIPTION OF THE DRAWING

FIG. 3 is a perspective view illustrating the wireway used in supporting cables;

FIG. 4 is an enlarged longitudinal sectional view, taken along line 4—4 of FIG. 3, showing the connection of the brackets to the support and joining of the support sections together;

DESCRIPTION OF THE PREFERRED EMBODIMENT

Figure 1:
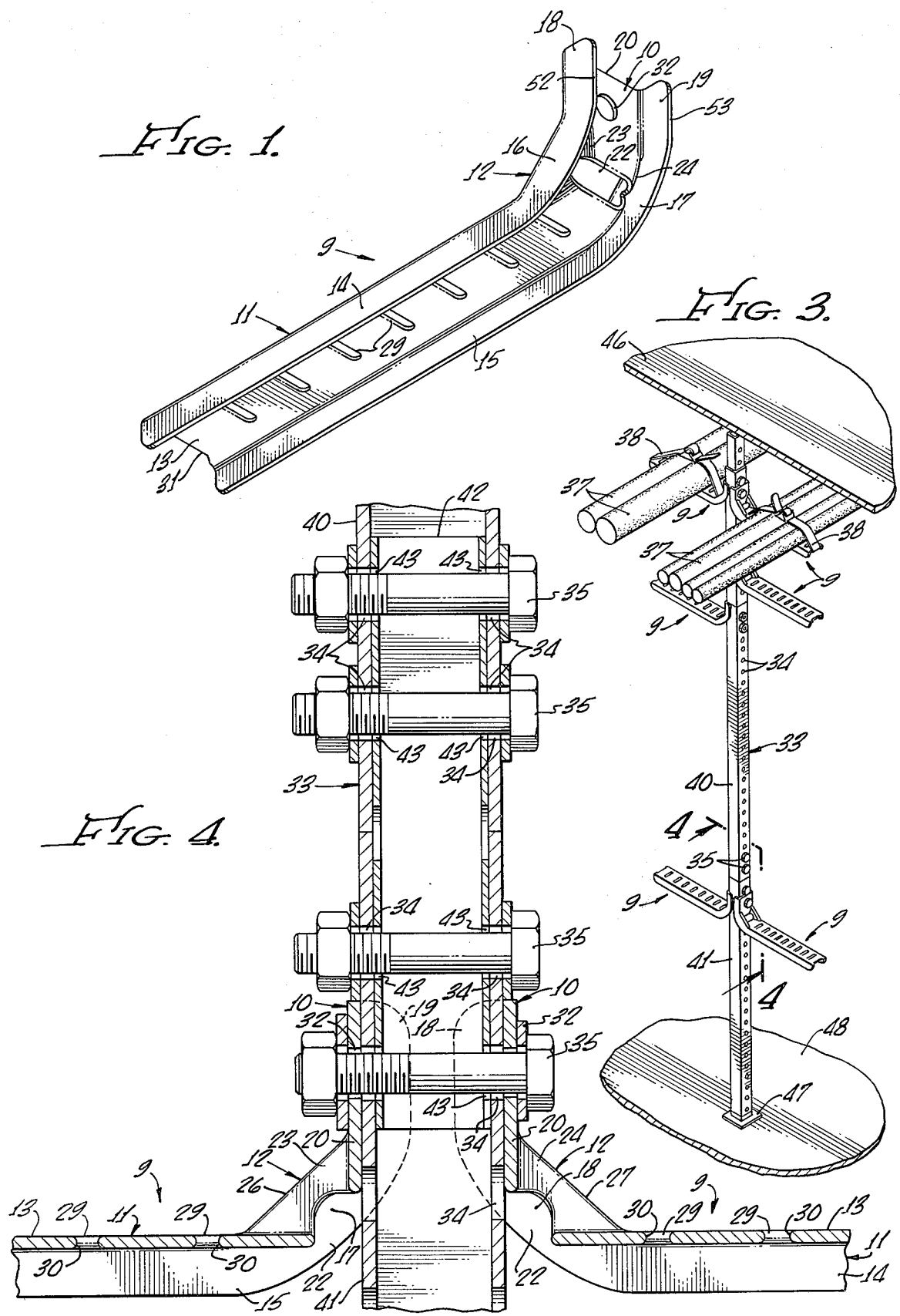
FIG. 1 is a perspective view of a bracket used in the wireway of this invention.

The wire hanger arrangement of this invention includes a one-piece bracket 9 which is generally L-shaped in side elevation. The bracket 9 includes a relatively short vertical portion 10 and a longer horizontal portion 11, between which is an interconnecting portion 12. The horizontal portion 11 includes a flat upper surface 13 with depending flanges 14 and 15 along its side edges and at right angles to it. Flanges 16 and 17 of the interconnecting portion 12 extend at 45° angles from the inner ends of the flanges 14 and 15 and form continuations of them. The vertical section 10 of the bracket 9 includes side flanges 18 and 19 which connect to the inclined flanges 16 and 17, as well as a flat, intermediate portion 20 from which the side flanges extend at right angles.

At the interconnecting portion 12, a transversely elongated opening 22 is formed between the flat portion 13 of the horizontal section 11 and the flat portion 20 of the vertical section 10. In this area the bracket includes webs 23 and 24 which are on the inside and spaced from the flanges 16 and 17. The webs 23 and 24 incline toward each other from rounded upper surfaces 26 and 27 where they connect to the side flanges 16 and 17. The webs 23 and 24 interconnect the surfaces 13 and 20 and so are generally triangular in shape but interrupted at their lower ends by the corners of the transverse opening 20. By this construction, the side flanges 16 and 17 cooperate with the webs 23 and 24 to form stiffening ribs which interconnect the horizontal portion 11 and vertical portion 10 of the bracket 9.

Spaced transverse slots 29 extend through the upper wall 13 of the horizontal section 11 of the bracket. These slots preferably are formed by a coining operation and provided with rounded edge surfaces 30 around their peripheries, avoiding stress concentrations so that cracks do not form under vibrational loads. At the outer end of the horizontal portion 11 of the bracket, there is a shallow central recess 31 which is approximately the same dimension transversely of the bracket as that of the slots 29.

A circular opening 32 in the intermediate portion 20 of the vertical part 10 of the bracket 9 is used in mounting the bracket on a supporting structure.

Figure 2:
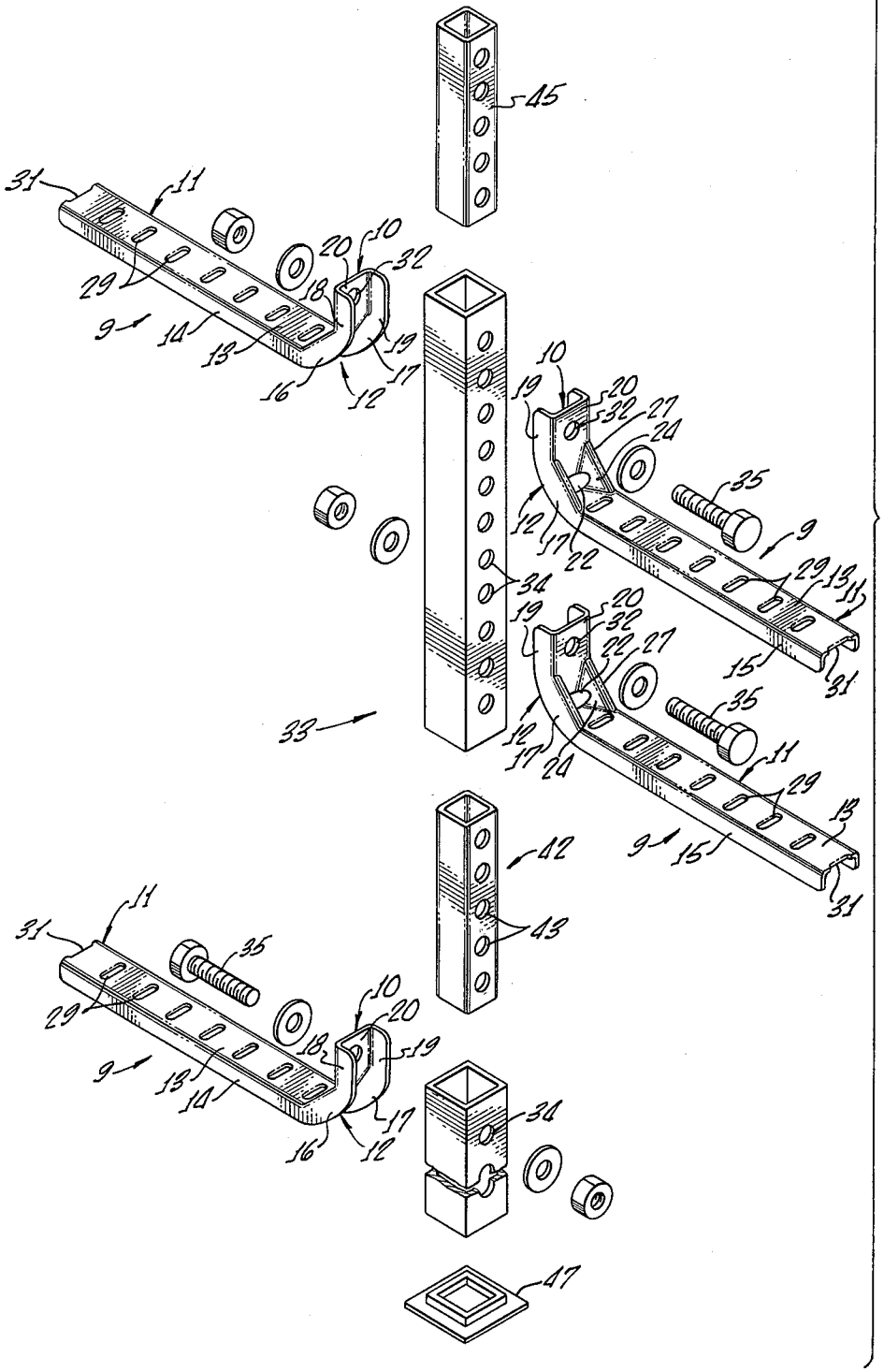
FIG. 2 is an exploded perspective view of components of the wireway assembly.

A number of the brackets 9 may be associated with a downcomer, such as the vertical post 33 shown FIGS. 2 and 3. The post 33 is a square tube having openings 34 in two opposite walls. The bracket 9 is dimensioned so that the vertical side flanges 18 and 19 will fit complementarily around the sides of the post 33, with the vertical surface 20 of the bracket then overlying the interconnecting portion of the post. A bolt 35 is extended through the opening 32 in the vertical portion 10 of the bracket and one set of the openings 34 of the post to secure the bracket to the post. The bracket 9 may be mounted at any vertical height on the post by appropriate selection of a pair of opposite openings 34 to receive the bolt 35. A single bolt 35 may hold two brackets 9 which are positioned on opposite sides of the post and at the same horizontal location. Alternatively, only one bracket may be held by the bolt. The locations of the brackets 9 along the post 33 will vary depending upon the number of cables they are to support and the environment within the ship. The brackets may be positioned very close together so that there is virtually no waste space and a large number of cables may be accommodated. In some conditions, it may be desirable to form additional bolt holes 34 in the other walls of the post 33 so that additional brackets 9 can project from the other sides of the posts. This versatility assists in routing the cables held by the brackets 9 around obstacles, such as steam or water lines.

With the brackets 9 secured to the post 33, cables 37 then are positioned on the horizontal portions 11 of the brackets. The cables 37 are readily associated with the brackets merely by being moved past the ends of the brackets and laid on the horizontal portions of them. They need not be fed through an opening as was common practice with prior wireway supports, and so may be laid out on the deck initially and then lifted onto the brackets 9. This substantially reduces the labor of attaching the cables to the supports. When the cables 37 are positioned on the brackets 9, they are then held in place by metal straps 38. The latter element extends over the tops of the cables 37 and under the surface 13 of the horizontal portion 11 of the bracket. The strap 38 may extend through any of the slots 29 to enable it to closely fit around a group of cables 37. The slots 29 are longer than the width of the strap 38 so that the strap will be flat within the slot. Generally, the strap 38 will be extended around the end of the bracket fitting within the recess 31. The edges of the recess 31 position the strap at the end of the bracket so that it will not become dislodged.

The ribs formed by the side flange of 16 and 17 and the webs 23 and 24 that they connect to result in a very rigid connection between the horizontal and vertical portions of the bracket and greatly increases its resistance to bending. The side flanges 14 and 15 along the horizontal portion 11 impart rigidity to that portion of the bracket. The flanges 18 and 19 of the vertical portion 10, by fitting around the sides of the post 33, maintain the bracket in the proper attitude, preventing it from rotating relative to the post 33.

The opening 22 between the horizontal and vertical surfaces 13 and 20 of the bracket allows the ribs of the interconnecting portion 12 to have sufficient depth and hence strength to support the heavy loads that may be imposed on the bracket. Also, the opening 22 permits the vertical surface 20 to have considerable length in contact with the side of the post 33 beneath the opening 32. This helps stabilize the bracket 9, lowering the point about which the bending moments are exerted on the bracket. Without the opening 22, these results are not achieved and the bracket would have considerably less resistance to bending.

The post 33 may be made in sections which readily permit it to be extended between the decks of a ship when installed. In the design of FIGS. 2 and 3, the post 33 includes sections 40 and 41 in end-to-end engagement, held together by an adapter 42. The adapter 42 is a short length of square tubing dimensioned to fit complementarily within the ends of the sections 40 and 41. The adapter 42 is provided with openings 43 in its opposite walls, corresponding in dimension and position to those of the openings 34 in the post 33. The two end pairs of openings 34 in the two sections 40 and 41 are aligned with the openings 43 in the adapter 42, and bolts 35 are extended through these openings to secure these sections together.

A similar adapter 45 at the top of the post 33, welded to the deck 46 above it, provides a simple attachment for the post to the deck. The upper post section is bolted to the adapter 45 in the same way as it is connected to the adapter 42. A sealing cap 47 is at the lower end of the post 33, engaging the bottom section 40 of the post and the deck 48 beneath the post.

Figure 6:
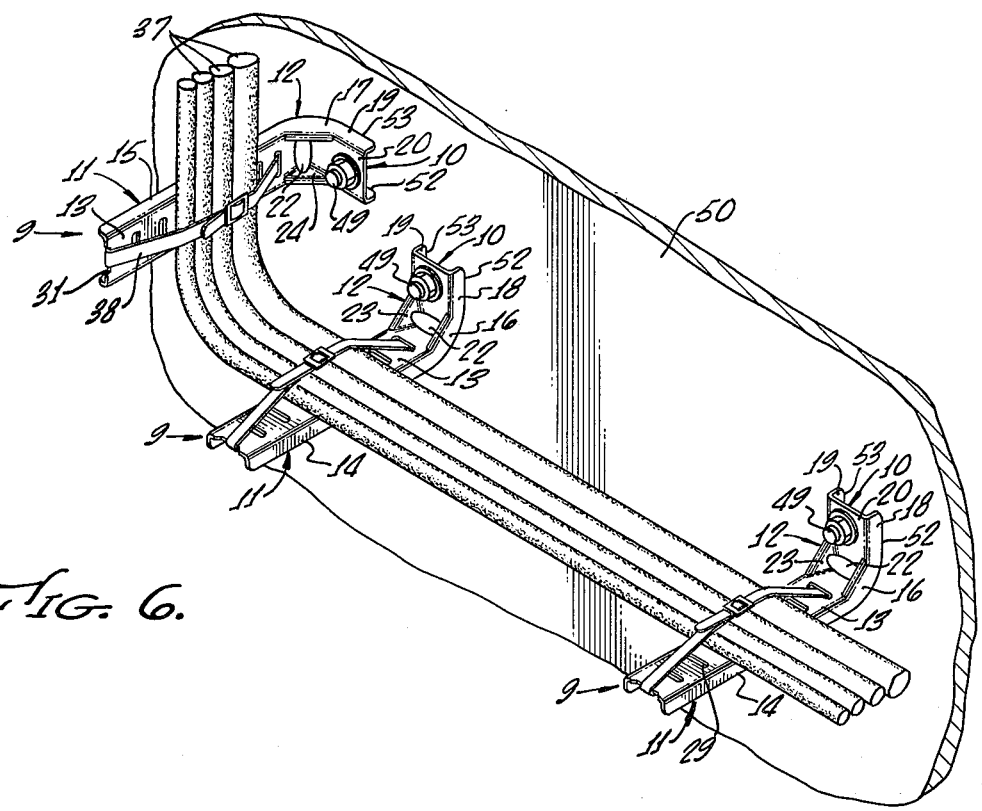
FIG. 6 is a perspective view of the brackets attached to a bulkhead and supporting cables.
Figure 5:
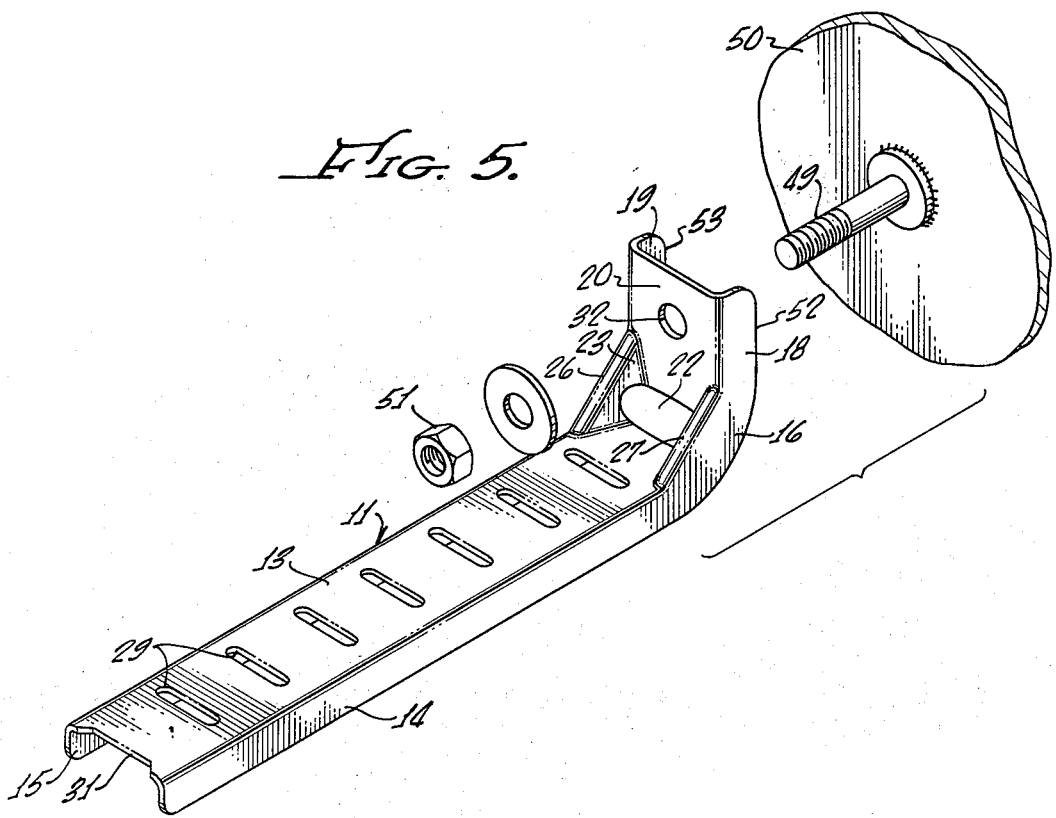
FIG. 5 is an exploded perspective view of an arrangement for attaching the bracket to a bulkhead.

The bracket 9 also may be secured to a bulkhead or wall in the manner shown in FIGS. 5 and 6. For such an installation, a stud 49 is welded to the bulkhead 50 wherever a bracket 9 is to be installed. The opening 32 in the vertical section 11 of the bracket receives the stud 49, with a nut 51 on the stud forcing the vertical section 10 of the bracket against the bulkhead. The outer edges 52 and 53 of the vertical side flanges 18 and 19 then bear against the surface of the bulkhead 50. These edges of the flanges 18 and 19 are straight, and by being forced against the flat surface of the bulkhead 50, rigidly position the bracket 9. Cables 37 then are positioned on the brackets 9 as before and held by straps 38.

The studs 49 may be located one above the other, as well as being spaced horizontally along the bulkhead 50. This allows the brackets 9 to be used in holding a vertical or angled run of the cables 37.

The foregoing detailed description is to be clearly understood as given by way of illustration and example only, the spirit and scope of this invention being limited solely by the appended claims.

We claim:

1. A supporting device comprising
a bracket adapted for attachment to a structural element, said bracket including
a first portion,
a second portion at an angle to said first portion,
each of said first and second portions including a central portion and a flange at either side edge of said central portion,
said flanges extending from the same side of said central portion, and,
a third portion interconnecting said first and second portions, said third portion including rib means extending between said first and second portions,
said rib means including two spaced ribs positioned one at either side of said bracket, a portion of said rib means forming a continuation of said flanges of said first and second portions, said central portions of said first and second portions having adjacent ends lying spaced from each other to define an opening through said third portion intermediate and extending to said ribs.

2. A device as recited in claim 1 in which said central portions of said first and second portions are planar throughout substantially the entire dimensions thereof and extend to opposite sides of said opening.

3. A device as recited in claim 1 in which said first and second portions are substantially at 90° to each other, and said ribs are substantially at 45° angles relative to said first and second portions.

4. A device as recited in claim 1 in which said first portion includes an aperture through the central portion thereof for receiving a fastener used in securing said first portion to a structural element, and said second portion includes a series of spaced transverse slots in said central portion thereof for receiving a strap used in securing objects to said second portion.

5. A device as recited in claim 4 in which said second portion is substantially planar and includes substantially flat principal surface, and said slots have convexly rounded edges extending from one of said principal surfaces to the other.

6. A device as recited in claim 4 in which said second portion has an outer end having a central recess in said central portion thereof for receiving a strap used in securing objects to said second portion.

7. A device as recited in claim 1 including in addition support means engaging said first portion for holding said bracket in a predetermined position.

8. A device as recited in claim 1 including in addition
a support post having spaced parallel side surfaces and
a flat interconnecting surface between said side surfaces,
said central portion of said first portion overlying said interconnecting surface,
said flanges of said first portion overlying said side surfaces,
and means connecting said first portion to said support post.

9. A device as recited in claim 8 in which
said support post includes a length of square tubing having at least one opening extending through opposite walls thereof,
said first portion having an opening through said central portion thereof,
and said connecting means includes a fastener extending through said openings in said central portion and said opposite walls.

10. A device as recited in claim 9 including in addition a relatively short section of square tubing shorter than said length of square tubing,
one end portion of said relatively short section of square tubing being substantially complementarily received in one end portion of said length of square tubing,
and the opposite end portion of said relatively short section of square tubing projecting outwardly beyond said end portion of said length of square tubing for attachment to an adjacent structure,
and fastener means connecting said one end portion of said relatively short section of square tubing to said length of square tubing.

11. A device as recited in claim 10
said relatively short section is of steel for facilitating attachment thereof by welding to a steel supporting structure,
and said length of square tubing is of aluminum alloy for providing the same with a relatively low weight.

12. A device as recited in claim 10 in which
said relatively short section of square tubing includes at least one opening extending through opposite walls thereof,
said length of square tubing having a plurality of said openings through said opposite walls thereof, one of which is in registry with said opening in said relatively short said fastener means including a fastener extending through said openings in registry for securing said relatively short section of square tubing to said length of square tubing.

13. A device as recited in claim 9 in which
said length of square tubing is in at least two sections in an end-to-end relationship, and including an additional section of square tubing substantially complementarily received in the adjacent end of said two sections of said length of square tubing,
and fastener means connecting each of said two sections of said length of square tubing to said additional section of square tubing.

14. A device as recited in claim 13 in which
said additional section of square tubing includes a plurality of openings extending through opposite walls thereof,
each of said two sections of said length of square tubing includes a plurality of said openings through said opposite walls thereof at least one of which is in registry with one of said openings in said additional section of square tubing,
and including a fastener extending through each of said openings in registry for securing said two sections of said length of square tubing to said additional section of square tubing.

15. A device as recited in claim 1 including in addition a support member, and stud means projecting outwardly from said support member, said first portion having an opening therethrough receiving said stud means for securing said bracket to said support member.

16. A device as recited in claim 15 in which said support member has a substantially flat surface from which said stud means projects, said flanges of said first portion bearing against said surface.

* * * * *

UNITED STATES PATENT OFFICE
CERTIFICATE OF CORRECTION

PATENT NO. : 3,923,277
DATED : December 2, 1975
INVENTOR(S) : Frederick Perrault; Raymond E. Perrault It is certified that error appears in the above-identified patent and that said Letters Patent are hereby corrected as shown below:

IN THE CLAIMS:

Column 6, Claim 12, line 23, after "short", insert

--- section of square tubing, ---.

Signed and Sealed this twenty-ninth Day of June 1976

[SEAL]

Attest:

RUTH C. MASON
Attesting Officer

C. MARSHALL DANN
Commissioner of Patents and Trademarks